Figure 1:
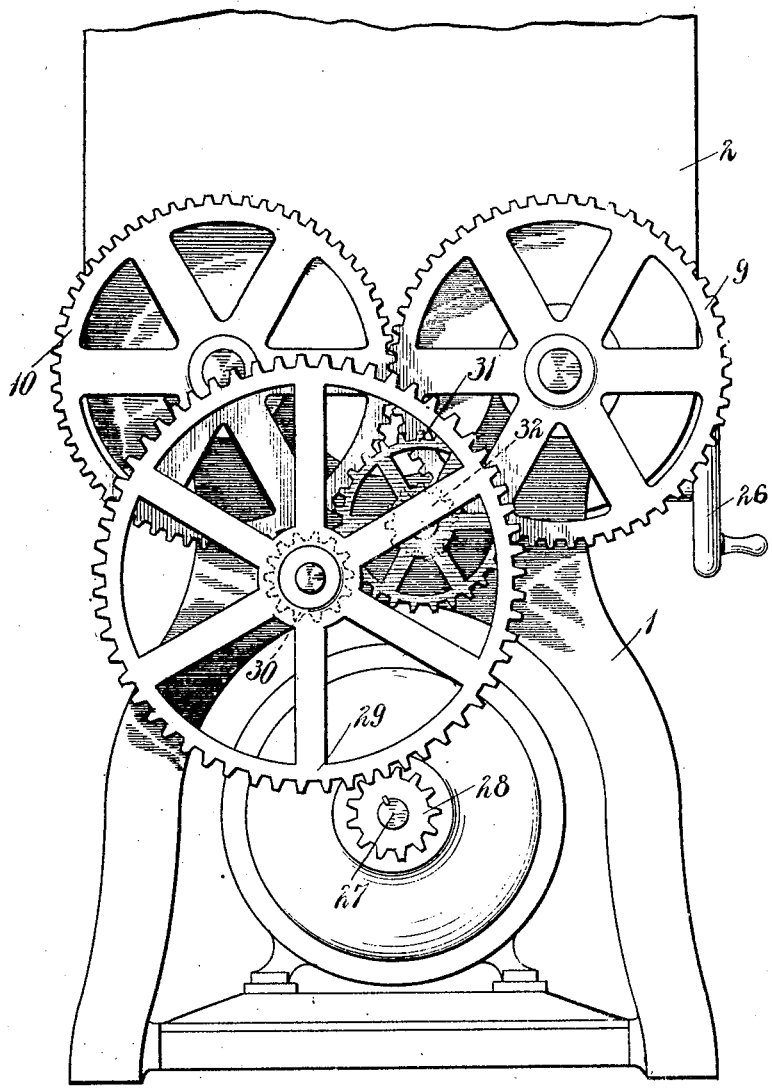

H. P. BARR.
KNEADING MACHINE.
APPLICATION FILED MAR. 2, 1905.

918,494.

Patented Apr. 20, 1909.
3 SHEETS—SHEET 1.

H. P. BARR.
KNEADING MACHINE.
APPLICATION FILED MAR. 2, 1905.

918,494.

Patented Apr. 20, 1909.
3 SHEETS—SHEET 2.

Witnesses
Inventor
Harry P. Barr
By his Attorneys

H. P. BARR.
KNEADING MACHINE.
APPLICATION FILED MAR. 2, 1905.
918,494.
Patented Apr. 20, 1909.
3 SHEETS—SHEET 3.
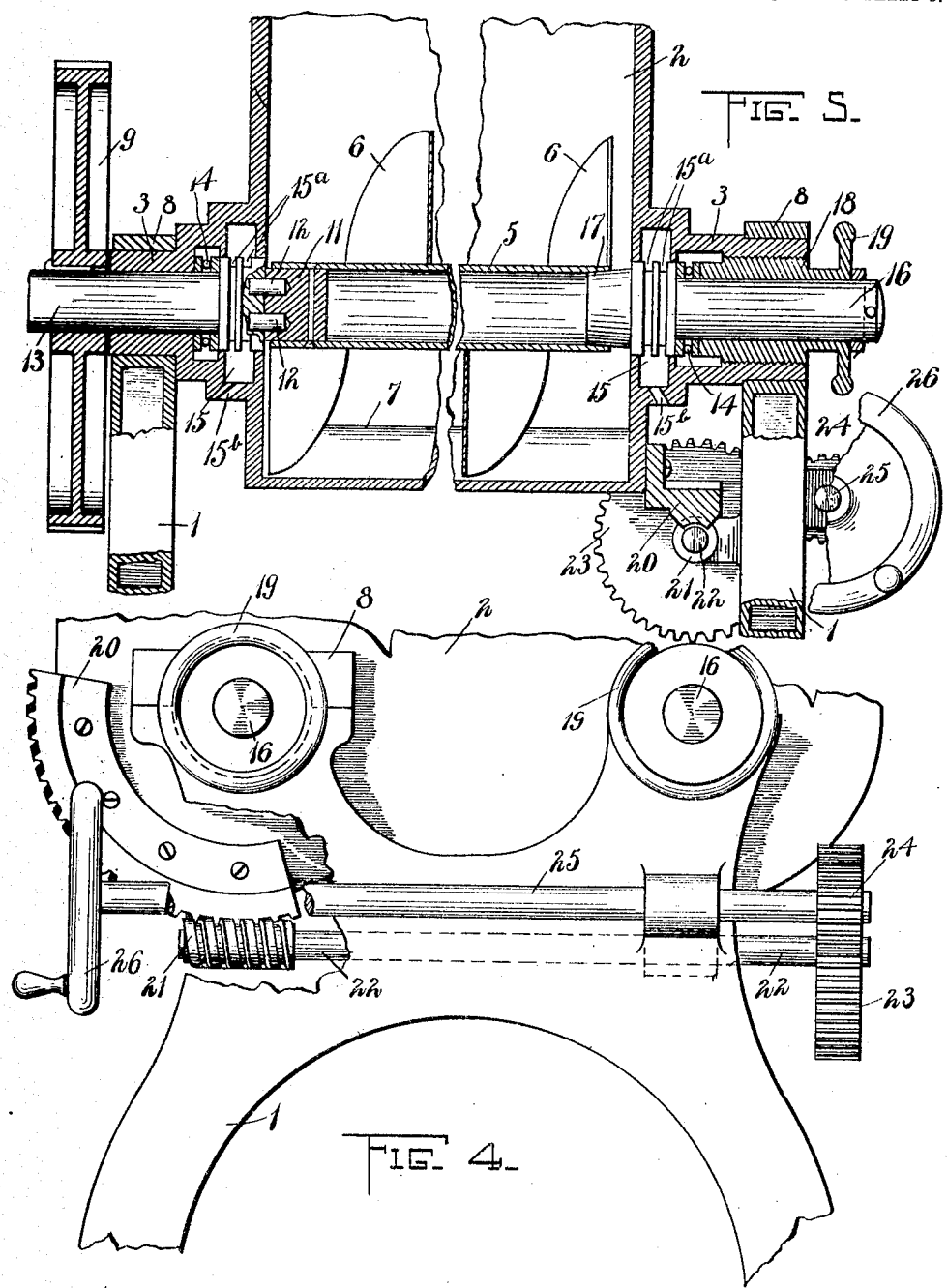

UNITED STATES PATENT OFFICE.

HARRY P. BARR, OF EAST ORANGE, NEW JERSEY.

KNEADING-MACHINE.

No. 918,494.  Specification of Letters Patent.  Patented April 20, 1909.

Application filed March 2, 1905. Serial No. 248,125.

*To all whom it may concern:*

Be it known that I, HARRY P. BARR, a citizen of the United States, resident of East Orange, county of Essex, State of New Jersey, have invented certain new and useful Improvements in Kneading - Machines, of which the following is a specification.

My invention relates to improvements in machines for kneading plastic substances, such as dough, and has for purposes the simplifying of the mechanism of such machines and perfecting their operation, the cheapening of their cost and reducing the power necessary to drive them and the labor of supervision, preparation and cleaning.

I have discovered that by subjecting the dough to pressure in channels or passages of varying area, the dough in its passage from the wider to the narrower portion of the kneading chamber is subjected to a kneading action which thoroughly intermingles the parts of the dough while subjecting it to continuous pressure and accomplishing a very rapid and thorough kneading of the dough.

Broadly considered, therefore, my invention consists in a machine adapted to subject the dough to kneading action in a chamber having a restricted area through which the dough is compelled to pass on its way to a further kneading operation. And preferably, the arrangement of parts is such as to force the dough repeatedly through such restricted area or areas of the chamber until the kneading operation is completed. The construction of the kneading area of the chamber may be made by narrowing or converging the walls of the kneading chamber at a point or points, or enlarging the cross-section of the kneading member or members at a part or parts.

A further valuable function of my machine is the causing of the dough to move in orderly manner through the kneading members consecutively—the parts being so arranged that the dough, on leaving one kneading member or channel is directed to the next member or channel and subjected there to further kneading action, instead of being all treated in mass without assurance that all the dough will be subjected to the consecutive action of all the kneading members.

My invention is especially adapted to that class of kneading machines in which spirally - formed or screw - shaped dough-working members are employed. Such members have been heretofore used in connection with kneading machines, but usually in connection with additional kneading or dough-working instrumentalities, no way having been heretofore suggested of rendering such screw - shaped kneading members sufficient alone to completely and homogeneously knead the mass. I have found that by imparting a proper shape to the contour of the bottom of the pan or trough and arranging the kneading screw in proper relation thereto, the complete kneading of dough may be accomplished by the mere coaction of the trough and screws upon the dough without the addition of other supplementary kneading devices; and my invention consists in this construction and arrangement of the mechanism and additional details of construction which will be first described with reference to the accompanying drawings and then pointed out in the claims.

I do not intend to hereby imply that my invention might not be present also in a machine which has in addition to the kneading screws and the peculiarly shaped trough herein described additional kneading devices so long as the same embodies the essential features of improvement of my invention hereinafter pointed out.

Figure 2:
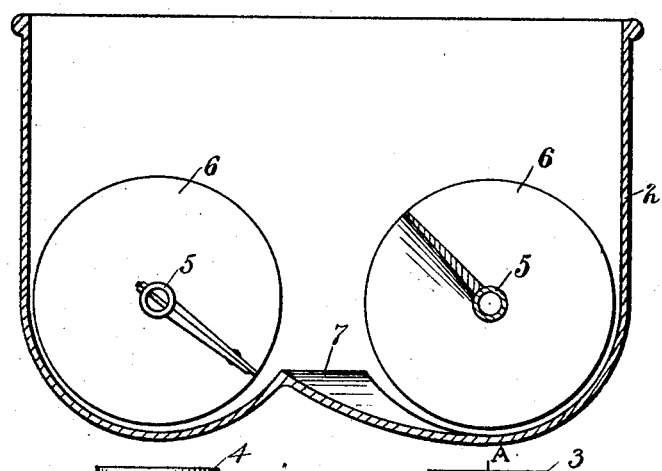
Figure 3:
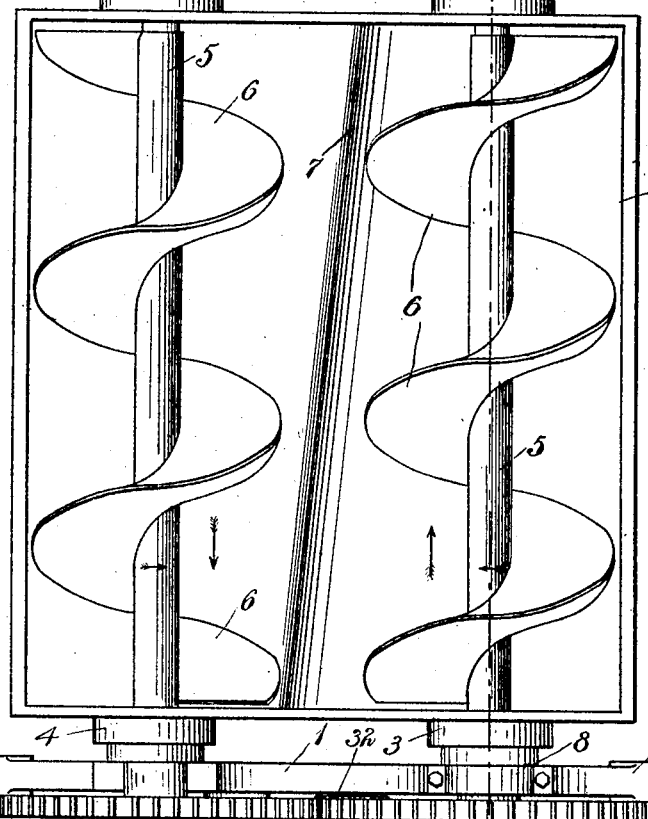

In the drawings: Figure 1 is an end view of the dough kneading machine, taken at the operating end of the machine. Fig. 2 is a transverse sectional view of the trough and kneading screws. Fig. 3 is a top view of a dough kneading machine embodying my invention, part of the supporting frame and driving mechanism being broken away. Fig. 4 is a partial end view, taken at the opposite end of the machine from that shown in Fig. 1. Fig. 5 is a vertical sectional view in a plane indicated by the line A—A, Fig. 3. Figs. 4 and 5 are to a larger scale than the remaining figures.

The frame 1 is preferably of hollow cast-iron, shaped to afford suitable support to the trough and the kneading and trough-operating mechanism. The trough or pan 2 has the four supporting hubs or arms 3, 3, 4, 4, surrounding the screw shafts and supporting the pan thereon, or, preferably as here shown, long enough to extend into bearings on the frame 1 and support the pan, while affording bearing for the said shafts. The hubs are, preferably, of the represented cylindrical form and two of them, to wit: the projections 3, form pivot trunnions whereupon the pan or trough may be turned up from its normal horizontal position when the dough is to be discharged. The construction adopted by me enables the maintenance of the driving connection with the screws irrespective of the position of the pan.

The portion 5 of the screw shafts to which the threads 6 are fastened are, as shown in Fig. 3, preferably tubular in form. The screws are preferably of the same direction of pitch so that when turned in opposite directions one will feed the dough toward one end of the machine and the other screw, taking it from that end of the machine, will return it to the first end. It is apparent, however, that a similar result will be reached by using a right-handed screw on one shaft and a left-handed one on the other and driving them in the same direction. To secure the proper kneading action on the dough, the screws are, preferably, of considerable width and are placed at some distance apart, the respective widths and distances being substantially indicated in Figs. 2 and 3. This construction while efficient in effecting the kneading of the dough which is brought in contact with the kneading screws would usually present this difficulty—there is left between the kneading screws a space in which some of the dough would gather, resisting the feeding action imparted to the remainder of the dough in the pan, and presenting as it were an eddy which would be made up either of entirely unkneaded dough or of dough only partially kneaded and giving off from time to time to the mass small lumps or bodies of unkneaded or partially kneaded dough, and some of it remaining until the end of said operation, fixed in position and entirely, or substantially, unchanged in character. This imperfect action I have entirely overcome by providing in the bottom of the pan the ridge 7, either formed of a separate piece from the body of the pan and rigidly fastened thereto, or, preferably, as shown in Fig. 2, formed by the proper shaping of the material of the bottom of the pan itself. This ridge may extend only partly, but preferably, as here shown, extends diagonally substantially entirely across the space between the screws, as most clearly appears in Fig. 3, and is so disposed as to present a narrowing channel or trough to the dough as it is forced from one end to the other of the pan. It may be of the height of the pan, but I have found it sufficient to make it only a part of that height, as here shown. The screws revolving in the direction of the short arrows in Fig. 3, will feed the dough in the direction of the long arrows in the said figure alternately from one end to the other of the pan, and the gradual contraction of the trough toward the end to which the dough is fed will cause all of the dough to be brought continually under the action of the kneading screws.

The bearing hubs 4 of the pan rest merely in open bearings in the top of the pan, but the trunnions 3 are held in their bearings by straps 8 so that the pan may, as already mentioned, be turned up about the trunnions 3 for discharging the dough. The shafts 5 of the screws may extend directly through the trunnions 3, 4, and bear upon their outer ends the driving gears 9, 10, which intermesh, as shown in Fig. 1, but preferably the construction shown in Fig. 5 is employed in which the screw-shaft is sectional in form, the pipe part 5 of the screw being limited in length so as to be freely inserted into and removed from the pan when detached from the remainder of the shaft.

The pipe 5 has at one end rigidly fastened to it the plug 11 having sockets for dowels 12 formed upon a spindle 13 which has bearing in the trunnion 3 and has keyed upon it outside of said trunnion the driving gear 9. A ball-bearing, or roller bearing 14, takes the end-thrust of this end of the shaft. At 15 I provide a trap for dough and oil creeping along the spindle, and within the trap the spindle is grooved or ribbed circumferentially at 15ª to arrest the creeping of dough and oil and cause them to deposit in the trap whence they escape at 15ᵇ. At the other end of the machine the spindle 16 engages the end of the pipe 5 by a tapering joint 17 and the nut 18 having hand-wheel 19 enables the forcing and holding of the parts together. Similar ball or roller bearings 14 and oil and dough trapping means 15, 15ª are provided at this end of the machine.

For tilting the trough to discharge the contents I provide upon it at 20 a segment-gear engaging a screw 21 of the shaft 22 which has a gear 23 meshing with the gear 24 on shaft 25 operated by hand-wheel 26. The gear segment 20 is concentric with the trunnions 3 and therefore with the shaft passing through said trunnions and its driving gear with which the gear 10 of the other screw-shaft is in constant mesh, whatever be the position of the pan.

The main driving-shaft 27 receives its motion from any suitable power and transmits it to the intermeshing gears 9, 10, by any suitable intermediate mechanism, as for example, by the intermediate gearing 28, 29, 30, 31, 32, the last member of which engages gear 9.

While I have shown only a single pair of kneading members, it is apparent that any number of screws in excess of two, for example, three or four may be used—the same arrangement of the rib or ridge between the contiguous screws as here shown being followed. It is further apparent that the construction may be modified in various ways without departing from the essential principle of my invention of having the two kneading members operating in separate or partly separate channels, each channel converging toward one end and at that end serving to discharge the dough to be taken into the broad end of the channel of another kneading member.

Having thus described my invention what I claim as new and desire to secure by Letters Patent is:—

1. In a dough kneading machine, the combination of a pan, kneading members therein revolving toward each other, and directing the dough, while kneading it, downward between the said members, and means in said pan for gradually directing the mass of dough while subjected to the kneading action, from one kneading member to the other.

2. In a dough kneading machine, the combination of a pan and a kneading member or members, so constructed and arranged that by the operation of the kneading member or members the dough is forced through a restricted channel or area while it is subjected to the compressive and kneading action of the kneading member or members and then into a channel or chamber where it is subjected to further kneading.

3. In a dough kneading machine, the combination of a pan and a kneading member or members, so constructed and arranged that by the operation of the kneading member or members the dough is repeatedly forced through a restricted channel or area while it is subjected to the compressive and kneading action of the kneading member or members and then into a channel or chamber where it is subjected to further kneading.

4. In a machine of the character described, the combination of a plurality of dough kneading members, and a pan therefor having a channel wherein each member works smaller at one end than the other, the channels of the respective kneading members being so disposed that the dough issuing from the small end of one channel is directed to the large end of another channel.

5. In a machine of the character described, the combination of a kneading pan, oppositely acting kneading members therein, and an interposed diagonally disposed dough directing member between said kneading members, arranged to direct the dough toward one end of one kneading member and toward the opposite end of the other kneading member.

6. In a machine of the character described, the combination of substantially parallel longitudinally-acting kneading members, and a containing pan having a diagonally disposed ridge on its bottom.

7. In a machine of the character described, the combination of longitudinally-acting kneading members, and independent troughs for the kneading members, each trough being smaller at one end than the other and the kneading members operated to feed the dough from the small end of one trough to the large end of the other trough.

8. In a machine of the character described, the combination of longitudinally acting kneading members, independent troughs for the kneading members, each trough being smaller at one end than the other, and means for feeding the material being treated from the small end of one trough to the larger end of the other trough.

9. In a mixing and kneading machine two continuous feeding and mixing spirals journaled in a mixing and kneading trough and interconnected by gearing adapted to rotate them always toward each other; in combination with an intermediate diagonally disposed and upwardly extending rib in the bottom of the mixing and kneading trough, the arrangement being such that the material is given, by one of the spirals, a continuous forward, downward, and compressive action from one end of the trough to the other, while the other gives to it a like continuous forward, downward and compressive action in reverse direction, whereby all of the material is simultaneously moved and subjected to a mixing and compressing action.

10. In a machine of the character described, the combination of substantially parallel longitudinally-acting kneading members, and a containing pan having independent troughs for said members smaller at one end than the other the small end of each trough being adjacent to the larger end of the other trough.

11. In a machine of the character described, the combination of substantially parallel kneading screws pitched and driven to propel the dough in opposite directions, and a containing pan having a ridge-shaped bottom diagonally disposed in the space between the kneading screws.

12. In a machine of the character described, the combination of the substantially parallel screw-shaped kneading members pitched and driven to propel the dough in opposite directions, and a containing pan having its bottom formed with a ridge extending diagonally across the space between said kneading members.

13. In a machine of the character described, the combination of a containing pan, separable kneading members within the pan, having at one end heads 11 provided with dowel sockets, supporting spindles for said kneading members, having at one end dowels engaging the said sockets, and suitable driving mechanism for said spindles, substantially as set forth.

HARRY P. BARR.

Witnesses:
WILLIAM P. HAMMOND,
HARRY E. KNIGHT.